United States Patent [19]

Guenther

[11] 4,138,308
[45] Feb. 6, 1979

[54] HEAT WAND FOR SPLICING TWISTED THERMOPLASTIC TAPES

[75] Inventor: Lloyd M. Guenther, Severna Park, Md.

[73] Assignee: Chevron Research Company, San Francisco, Calif.

[21] Appl. No.: 837,788

[22] Filed: Sep. 29, 1977

[51] Int. Cl.² .................. B65H 69/06; B65H 69/08
[52] U.S. Cl. .................. 156/433; 156/443; 156/502; 156/556; 156/579
[58] Field of Search .......... 156/158, 159, 200, 166, 156/251, 433, 579, 367, 502, 443, 556; 57/159; 242/35.6; 140/115, 119, 120

[56] References Cited

U.S. PATENT DOCUMENTS

| | | | |
|---|---|---|---|
| 2,098,945 | 11/1937 | Davis | 140/115 |
| 2,863,492 | 12/1958 | Chang et al. | 156/158 |
| 2,949,939 | 8/1960 | Milla | 140/115 |
| 3,184,354 | 5/1965 | Strother | 156/579 |
| 3,294,614 | 12/1966 | Abelsma | 156/433 |
| 3,359,151 | 12/1967 | Hau | 156/579 |
| 3,690,994 | 9/1970 | Williams | 156/502 |
| 3,827,929 | 8/1974 | Bledsoe et al. | 156/158 |
| 3,890,189 | 6/1975 | Tessman et al. | 156/502 |

FOREIGN PATENT DOCUMENTS

| | | | |
|---|---|---|---|
| 2450018 | 4/1976 | Fed. Rep. of Germany | 156/158 |
| 1582148 | 9/1969 | France | 156/158 |

Primary Examiner—Jerome W. Massie
Attorney, Agent, or Firm—R. L. Freeland, Jr.; H. D. Messner

[57] ABSTRACT

Instead of being butt-spliced, thermoplastic tapes used to form yarn used by carpet manufacturers are sealed along a longer bias of their off-centered, cross alignment, (providing greater strength but without additional bulk) by means of a heating wand and method of the present invention. The wand includes means for first untwisting the tapes over a short segment thereof and then placing them in relative cross-alignment positions relative to a transversely located heating element. The heating element is in intermittent circuit with an energy source.

4 Claims, 10 Drawing Figures

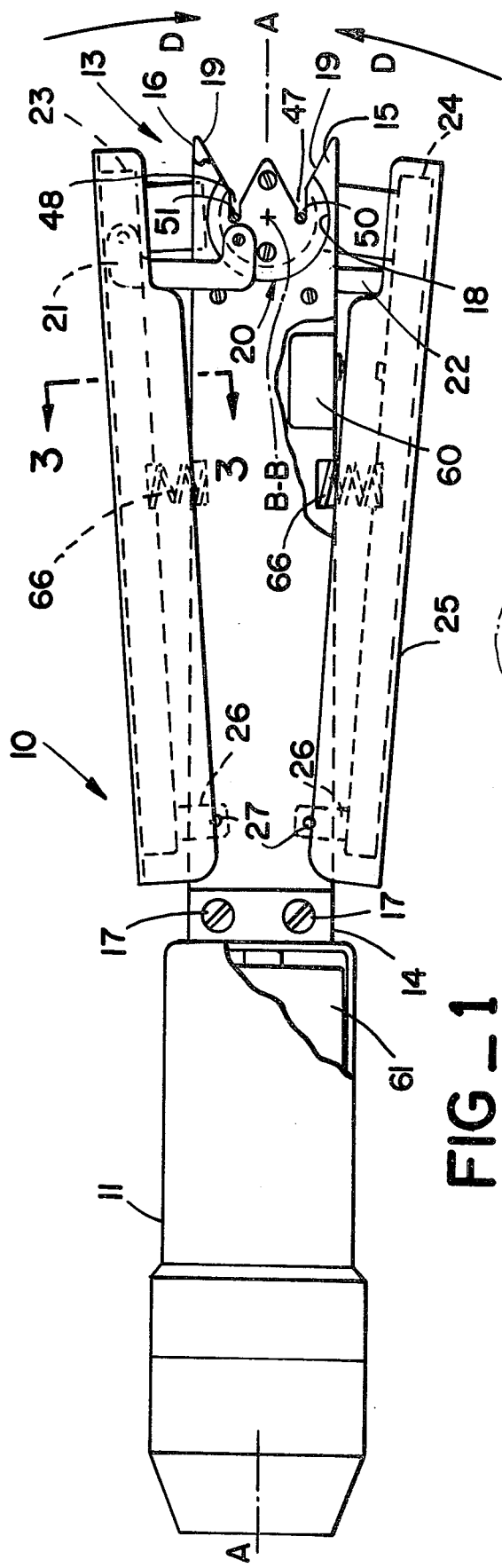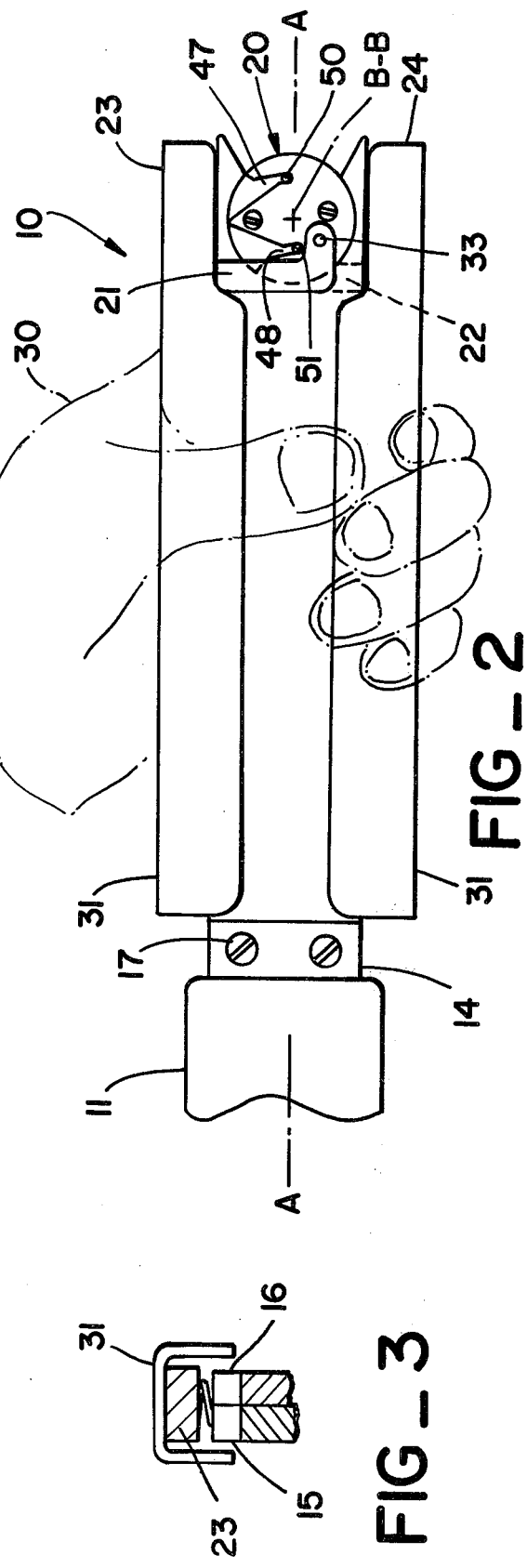

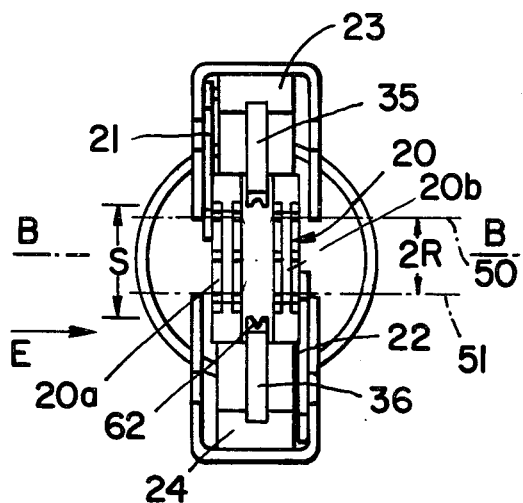
FIG_4
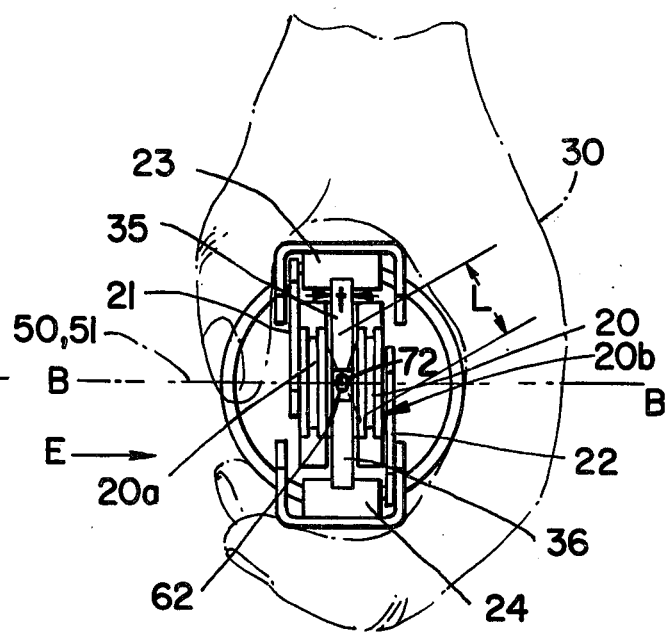
FIG_5
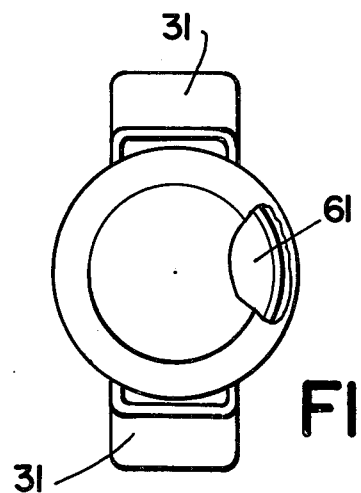
FIG_7
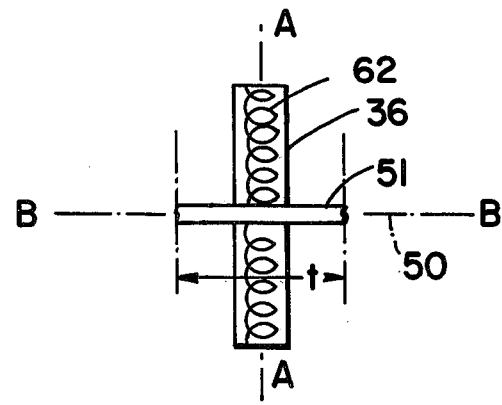
FIG_8a
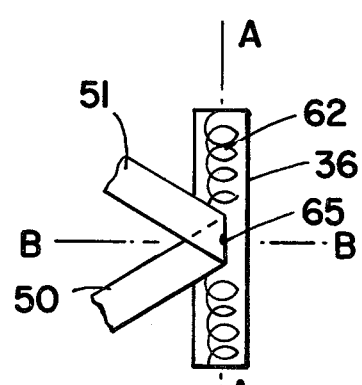
FIG_8c
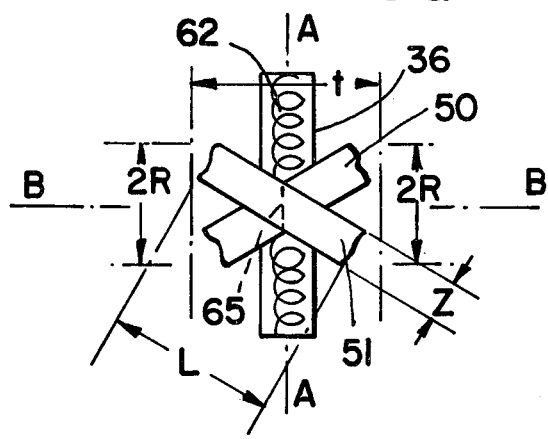
FIG_8B

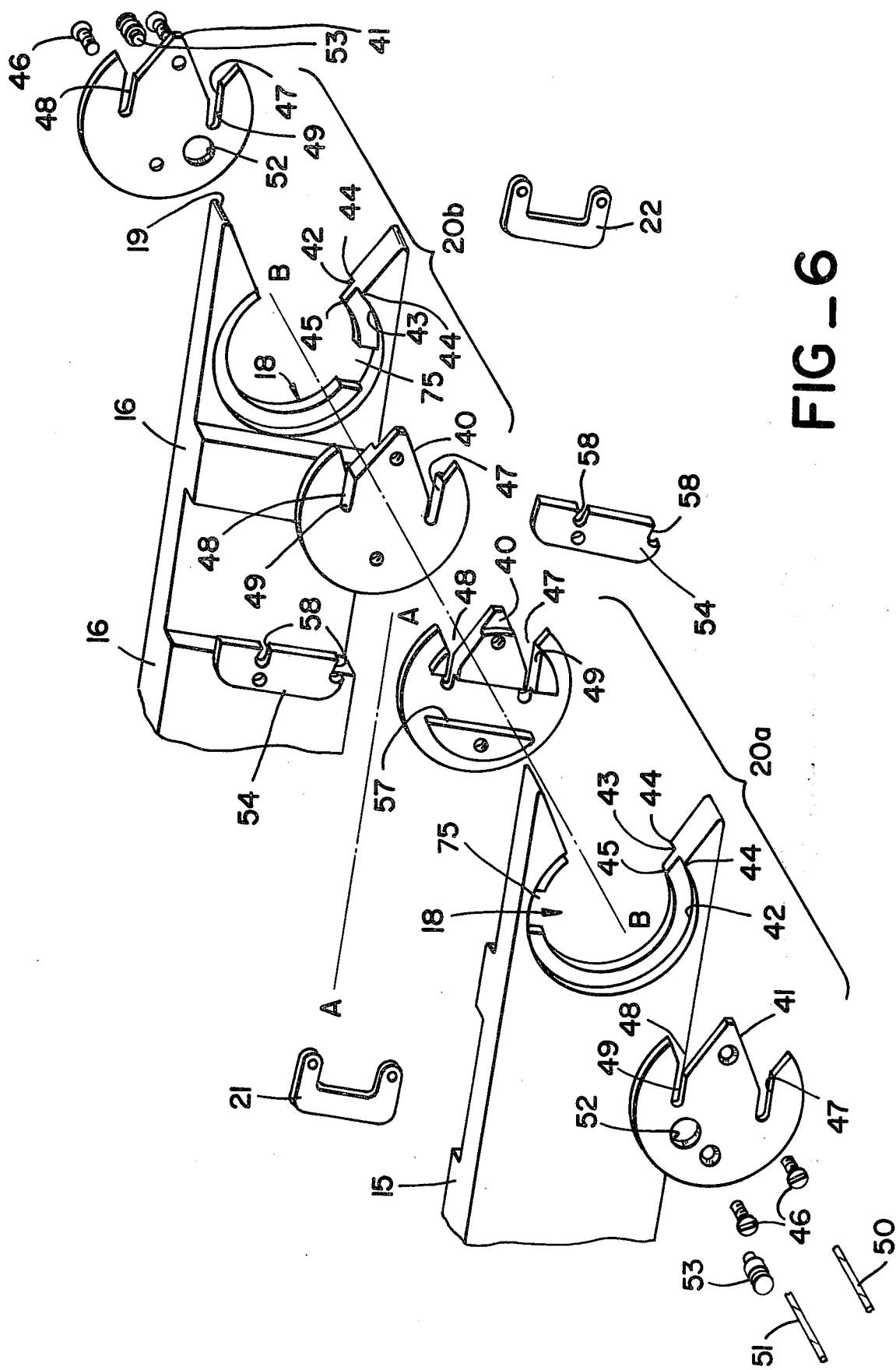
FIG_6

HEAT WAND FOR SPLICING TWISTED THERMOPLASTIC TAPES

DISCLAIMER

While the above Abstract has been carefully written, the purpose of such statements is to provide a non-legal description of the contents of the application as a searching, scanning and classification aid for technical persons. Accordingly, all hereinbefore-presented statements are not intended to be used in understanding or otherwise comprehending the principles of the invention to be described in detail hereinafter, and are not, more particularly, to be used in interpreting or in any way limiting the scope and fair interpretation of the claims appended hereto.

FIELD OF THE INVENTION

This invention relates to the manufacture of yarns, and more particularly to the heat-splicing of thermoplastic tapes useful in forming yarns for carpet manufacturers.

BACKGROUND OF THE INVENTION

Yarn manufacture can include twisting together of long strands of films, tapes and/or threads to form the yarns such as used in the manufacture of carpet. Breaks can occur in the yarn, however, requiring repair; the shearing can be inadvertent as when too much tension is applied at the ends or as a purposeful occurrence to form longer yarn lengths. There are numerous methods available in the art to effect repair.

In thermoplastic yarn manufacture for carpet makers using tapes or film, the task can be somewhat more complicated; the tapes undergo twisting during manufacture; heat-splicing then requires each tape end to be untwisted prior to actual application of heat. Also, there are strength and bulk limitations: (i) shear strength of the spliced tapes must not fall below a set value, say 3 lb. tensile pull for a 3700-denier yarn; and (ii) all-over diameter or maximum transverse width of the final seal must be below a minimum eyelet size of the tufting needles later used in forming carpet. Still further, the splicing wand should be portable and carry its own power supply so that mending can take place away from usual work stations.

SUMMARY OF THE INVENTION

The present invention relates to a splicing wand and method for use in which an assembler, after placing two tapes to be spliced therein, squeezes together opposing jaws of the wand so that a positioning and holding means at the far end thereof cross-aligns the tapes in the region of a transversely aligned heating element in intermittent circuit with an energy source. In more detail, the tapes are first placed in eyelets of a pair of rotatable disks from a common direction parallel to the axis of rotation of the disks. Then the tapes are displaced, relative to each other, one above the other, say from 6:00 and 12:00 o'clock positions in elevation at 3:00 and 9:00 o'clock positions. In order to untwist the films, the two counter-rotatable disks are provided with selective clamping dogs which permit sliding of the tapes relative to the disks, but not rotation. Hence, as the disks are driven in rotation counter to one another, there is an unwinding of the tapes simultaneously with the changing of their relative locations into final, off-center, cross-alignment position noted above. Also, as rotation of the disk ends, contacts of a switch are closed, placing a heat element positioned (tranverse to the original working axes of the tapes) in circuit with an energy source. Since the heating element is precisely positioned, its sealing plane remains transverse to the axis of rotation of the disks and intersects the two overlapping tapes on a diagonal bias offset from colinear alignment of each. Upon release of the tapes from the wand, the twist "memory" returns to the section under seal, and the tapes are whole again.

DESCRIPTION OF THE DRAWINGS

Further features of the invention will become more apparent upon consideration of the following detailed description of the invention when taken in connection with the accompanying drawings, wherein:

FIGS. 1 and 2 are side elevations of the wand of the present invention illustrating angular closure of a jaw section of the wand relative to axis A—A:

FIG. 3 is a section taken along line 3—3 of FIG. 1;

FIGS. 4 and 5 are front elevations of the wand of FIGS. 1 and 2, respectively, in which tapes 50, 51 are schematically illustrated;

FIG. 6 is a partially exploded perspective of the jaw section of the wand of FIGS. 1 and 2;

FIG. 7 is a rear elevation of the wand of FIG. 1; and

FIGS. 8A, 8B and 8C are schematic diagrams of several elements of the jaw section of the wand of FIG. 6 illustrating positioning of thermoplastic tapes relative to the axis of rotation B—B of the disks and with respect to a heating element used to heat splice the tapes together.

PREFERRED EMBODIMENTS OF THE INVENTION

As shown in FIG. 1, wand 10 of the present invention includes a cylindrical handle 11 attached to a jaw section 13 at a swedged midportion hub section 14. Still referring to FIG. 1, jaw section 13 is divided into two functional subassemblies: movable and stationary elements.

As to stationary elements, the jaw section 13 includes two coextensive support bayonets 15 and 16 which extend from and attach to midportion hub section 14 by means of screws 17. These bayonets 15, 16 are symmetrically spaced about longitudinal axis A—A of wand 10 and each is notched to form a central entryway 18 at common remote ends 19 opposite to hub section 14. Into such entryways 18 are positioned first and second disks generally indicated at 20. As explained in detail below, the disks 20 are mechanically linked — by C-shaped links 21, 22 — to angular movement of pivot arms 23, 24.

As shown, each pivot arm 23, 24 includes a central segment 25 which extends nearly the full length of each arm. At the end adjacent to central hub 14, a pivot post 26 extends toward and attaches to bayonets 15, 16 as by pivot pin 27. Note that each pivot arm 23, 24 is capable of angular travel toward axis A—A along arrow D. Such travel can be initiated by an assembler squeezing the pivot arms 23 and 24 simultaneously.

FIG. 2 illustrates the travel paths of pivot arms 23, 24 in more detail.

As shown, hand 30 of an assembler brings the arms 23, 24 to final positions so that the axes of symmetry thereof are parallel to that of axis A—A by the wand. In order to protect the folds of skin of the hands of the assembler, each pivot arm 23, 24 includes a shroud 31.

As shown in FIG. 3, shroud 31 is rounded and is of sufficient depth to prevent skin intrusion — during angularly movement — between the pivot arm 23, 24 and support bayonets 15, 16.

Note also in FIG. 2 that links 21, 22 are brought into final coplanar alignment normal to axis A—A. Since the links 21, 22 change relative elevation (with respect to each other) but are pinned to disks 20 by pins 33, angular movement of the arms 23, 24 cause rotation of the disks about axis B—B normal to axis A—A.

FIGS. 4 and 5 illustrate that closure of pivot arms 23 and 24 cause movement of not only pairs of rotatable disks 18 (via links 21, 22), but also anvils 35, 36 attached to arms 23, 24 are brought toward and into adjacent orientation with axis B—B, the axis of rotation of the disks 20; i.e., the spacing S between the anvils 35, 36 changes from a finite value to approximately zero. In this regard, note that the rotation of the pairs of disks 20 are in opposite directions. In FIGS. 4 and 5, rotation of disk pair 20a is counterclockwise in the direction of arrow E while pair 20b is clockwise assuming the direction of reference E stays fixed.

Complex movements involving disk pairs 20a 20b and links 21, 22 (with respect to stationary bayonet supports 15, 16) may become more apparent with reference to FIG. 6.

As shown, axis B—B of rotation of the link pairs 20a, 20b coincides with the working center of entryway 18 of each support bayonet 15, 16. Each disk pair 20a, 20b is formed of an interior and exterior cylindrical members 40, 41, respectively. (The terms "interior" and "exterior" denote the relative orientation of members 40, 41 with respect to axis of symmetry A—A of the wand). The diameter of the members 40, 41 is carefully sized to fit within angular races 42 and 43 formed between shoulders 44 and 45 of the entryway 18. Hence, after attaching the members 40, 41 together, as by screws 46, rotation in tandem about axis B—B is confined to the races 42, 43.

Each member 40, 41 is provided with a pair of parallel eyelet slots 47, 48 offset — equally — from axis B—B. Slot width defined by side wall 49 does not, however, remain parallel constant throughout the entire length of each slot. Note at their intersection with the periphery of each member 40, 41, i.e., at the "open" end of each slot 47, 48, the width is enlarged to a substantial degree. This allows easier entry of pairs of tapes 50, 51 into the open end of the slots 47, 48 of each disk pairs 20a and 20b. The "closed" end of the slots 47, 48 is about coplanar with each other and axis B—B of rotation.

Still, with reference to FIG. 6, note also that each exterior member 41 is provided with an oversized offset opening 52 through which extends pin 53. Each pin 53 has ends for permanent connection to links 21, 22 — at one end — and to clamping dogs 54 — at the remaining end.

Clamping dogs 54 are of rectangular cross-section and are fitted — and slidable — within channels 57 of interior members 40. Each dog 54 includes a pair of tear-drop openings 58 alignable with eyelet slots 47, 48 of the disk pairs 20a, 20b. The orientation of the openings 58 relative to slots 47, 48 is important for reasons stated below. Suffice it to say, that in order to prevent rotation of the tapes 50, 51, careful positioning of these elements containing these openings, is required.

In FIG. 6, note that tapes 50, 51 are vertically coplanar with each other and the axis B—B of rotation. Such an orientation initially occurs when the tapes (to be spliced) are fed to the wand, within eyelet slots 47, 48, whereby they are at the 6:00 and 12:00 o'clock positions in the elevational view of FIG. 1, with respect to axis B—B.

Relative position of the tapes changes dramatically when the wand is activated, however. As shown in FIG. 2, relative rotation of pivot arms 23, 24 then places the tapes (positioned in the eyelet slots 47, 48) at the 9:00 and 3:00 o'clock position in the elevational view of FIG. 2, with respect to axis B—B.

Coincidentially with termination of rotation of the disk pairs 20 of FIG. 2, an electrical circuit within the wand 10 is closed by activating switch means 60 of FIG. 1 between arm 24 and bayonet support 15. Result: current from battery 61 (in handle 11 of FIGS. 1 and 7) drives a heater 62 located in the surface of anvil 36, see FIGS. 4 and 5. Note the location of the heater 62 in more detail: it's in the plane of axis A—A but normal to axis B—B in close proximity to the tapes to be spliced. Result: sufficient heat can penetrate the latter to provide a heat seal of the tape pair, and sever the tails.

METHOD OF THE INVENTION

Having established a firm foundation by the aforementioned described apparatus, a description of use of the invention is in order and is presented below.

With specific reference to FIG. 1, the pair of tapes 50, 51 are located within eyelet slots 47, 48 of the disk pairs 20a and 20b vertically coplanar to each other and the axis of rotation B—B. Of interest is the fact that as the pivot arms 23 and 24 are brought toward the central axis A—A but before rotation of the disk pairs 20a, 20b occurs, the tapes 50, 51 are "clamped" within the eyelet slots 47, 48 of the disk pairs 20a, 20b as follows: (1) in FIG. 6, the links 21, 22 are seen to be pinned to clamping dogs 54 via pins 53. Note the difference in diameter between the pins 53 and openings 52 through which the former extend while pins 53 are affixed to clamping dogs 54 and links 21, 22 as previously explained, at ends thereof. Due to the fact that the openings 52 are larger than the diameter of the pins 53, initial angular movement of the pivot arms displaces both 21 and 22 and the clamping dogs 54 toward slots 47 and 48. Due to the tear-drop openings 58 within the clamping dogs 54, such vertical displacement carries the tapes 50, 51 to be wedged within the eyelet slots. (2) As the pins 53 (carried by links 21, 22) reach a travel point which places them into contact with the sidewall of slot 52, rectilinear movement of clamping dogs 54 ends, and rotation of the pairs of disks 20a, 20b begins. Note also in FIG. 6 that the races 42, 43 of the bayonets 15 and 16 are each discontinuous over an angular segment. Notches 75 (FIG. 6) are formed into which dogs 54 extend. Until the dogs 54 clear the notches, rotation of the disk pairs 20a, 20b cannot occur. The extent of rotation of each disk pair 20a, 20b is about ¼ turn each; but since each pair of disks is rotating in opposite directions relative thereto, the total travel of both pairs is about ½ turn. Because the captured segments of the tapes 50, 51 within the wand is less than ½ inch, such rotation almost completely untwists the segments of interest. Redirection of the relative orientation of the tapes 50, 51 has an additional advantage. It brings them into correct off-center, cross-alignment with respect to the heating circuitry of the wand.

With reference to FIGS. 8A-8C, the effect of relative rotation of the disk pairs on tapes 50, 51 is illustrated in detail.

In the plan view of FIG. 8A, tapes 50, 51 are coplanar with axis B—B but displaced a distance 2R, where R is the radius of the closed end of eyelet slots 47, 48 of disk pairs 20a, 20b (FIG. 6).

The tapes 50, 51 are normal to heater 62 within anvil 36, and axis A—A of symmetry. The initial "capture" length of the tapes 50, 51 is schematically shown to be equal to a distance "t" and is equal to the spacing between the disk pairs 20a, 20b, see FIG. 5. Note also in FIGS. 8A-8C that the heater 62 is illustrated as a helix for didactic purposes only. In actual practice, the heater 62 is more longitudinally inclined and, in fact, in not helical at all.

FIG. 8B illustrates the reorientation of the tapes 50, 51 prior to actual application of current to the heater 62. Assuming the total length of the "captured" tapes is now equal to "L", then the latter can be related to distance "t" between the disk pairs and the radius of their eyelet slots in accordance with $$L = \sqrt{t^2 + 4R^2}$$

For the above, the degree of "untwisting" by the wand of FIG. 1 is equal to: ½ t turns per inch. Typically, for a 3800 denier carpet yarn with 1½ turns per inch (TPI), "t" would be about ⅜". Hence, reorientation due to counter rotation of the disk pairs would provide "untwisting" equal to about 1⅛ turns per inch. But assuming the tapes 50, 51 contained 1½ turns per inch, note that such action is sufficient to "untwist" the tapes due to the fact that at their free ends the tapes would be somewhat retarded. Hence, an "untwist" in the amount of 1⅛ turns per inch of the region of interest is sufficient to remove substantially all of the twist from typical 1½ TPI tapes.

Thereafter, current is passed to the heater 62 in the manner previously explained. Heat is generated at the central regions of cross-alignment of the tapes 50, 51 and the heater 62. The resulting bead is usually along diagonal bias 65 parallel to axis A—A. In more detail, the bead of tapes 50, 51 are melted over a region defined by channel 72 of anvils 35, 36, see FIG. 5. The heater 62 within the anvil 36 provides sufficient heat to sever the tapes 50, 51 and also to form the bead as dictated by the shape of the longitudinal and vertical alignment of the channels 72. In practice, the bead depth should be sufficient that the tapes 50, 51 cannot be easily severed by axial pull of subsequent operations. Ends of the tapes (tape tails) fall away (FIG. 8C). Note the bias 65 has a length greater than the maximum width "Z" of the tapes since a plane through the bias also passes through the tape at an acute angle with respect to the axis of symmetry of the tape. I.e., the plane of interest is not perpendicular to the longer side of the tapes.

Current to the heater 62 is terminated by releasing the switch (not shown in FIGS. 8A-8C) in circuit with the heater 62.

After the spliced area has cooled, the assembler allows the disk pairs to counter-rotate under pressure of springs 66 (FIG. 1) and the former are returned to their original positions. The spliced tapes can be released.

From the above it is apparent that the invention as described hereinbefore provides an apparatus and method for heat-splicing tapes of thermoplastic material without creating a bulky seal, However, the invention is not limited to the combinations of embodiments hereinbefore described, and it should be understood that the invention is not limited to those specific embodiments, as variations are readily apparent to those skilled in the art.

For example, pivot arms 23, 24 and shroud 31 of the wand 10 may be extended in the direction of handle 11 so as to increase the pivot length of the jaw section 13. Such a configuration provides a more comfortable hand grip and allows the whole hand to provide the closure force. Further, while the wand is shown to be symmetrical about axis A—A, it has been found desirable in some cases to offset the channels 72 of the anvils 35, 36 outwardly from the axis A—A toward the tape tails so that bulk is added to the final spliced tapes. I.e., the channels 72 within the anvils 35, 36 would no longer be coincident with axis A—A but would be skewed therefrom. While the resulting tapes add more bulk, such limitation is offset by their greater strength. Hence, the invention should be given the broadest possible interpretation in terms of the following claims.

What is claimed is:

1. A wand for heat splicing at least two twisted thermoplastic tape, film or thread means together each having an axis of symmetry, comprising:

a housing carrying holding and positioning means and circuit means therein, said holding and positioning means including clamping means for clamping said tape, film or thread means over common lengths thereof at a series of initial locations so as to prevent rotation of said tape, film or thread means about said axes of symmetry, but to allow rectilinear movement therebetween, and rotatable means for rotating said tape, film or thread means in relative directions opposite to a common twist direction of said tape, film or thread means to a series of final positions in which said tape, film or thread means are each untwisted over a substantial portion of said common lengths thereof while being simultaneously oriented into lapped, cross-aligned heat-receivable positions relative to each other, said circuit means including switch means activated by movement of said holding and positioning means relative to said housing to apply heat over a diagonal bias of said lapped, cross-aligned, heat-receivable positions of said tape, film or thread means whereby said at least two tape, film or thread means are heat spliced together.

2. Said wand of claim 1 in which said rotational movement of said tape, film or thread means in said relative directions opposite to said common twist direction of said tape, film or thread means is about a common axis B—B, said series of designated initial locations of said tape, film or thread means undergoing angular movements from a first common plane passing through said axis of rotation B—B and said initial locations to said series of final positions defining a second common plane substantially normal to said first plane also passing through said axis of rotation B—B.

3. Said wand of claim 2 in which said series of designated initial locations are four in number with each pair of locations associated with two tape, film or thread means undergoing opposite angular rotation about said axis B—B relative to each other to provide for simultaneously untwisting of said at least two tape, film or thread means relative to one another while ultimately placing them in said lapped cross-aligned heat-receivable positions relative to circuit means.

4. Wand of claim 1 in which said holding and positioning means includes a pair of support arms pivotally mounted to said housing, a pair of disks attached to said support arms and rotatably mounted with respect to said housing, said disks means pair having two parallel slots, each having one open and one closed end, into which said two tape, film or thread means are positioned and rotated about axis B—B, and in which said clamping means include dog means slidably aligned with said parallel slots and operative as a function of angular movement of pivot arms of said housing to clamp said tape, film or thread means in a controlled manner whereby angular rotation of said tape, film or thread means is prevented but whereby rectilinear travel thereof with respect to said pair of disks means is permitted.

* * * * *